Nov. 16, 1954   E. T. RIZA   2,694,321
HOLE PLANER AND BURRING TOOL
Filed July 2, 1953
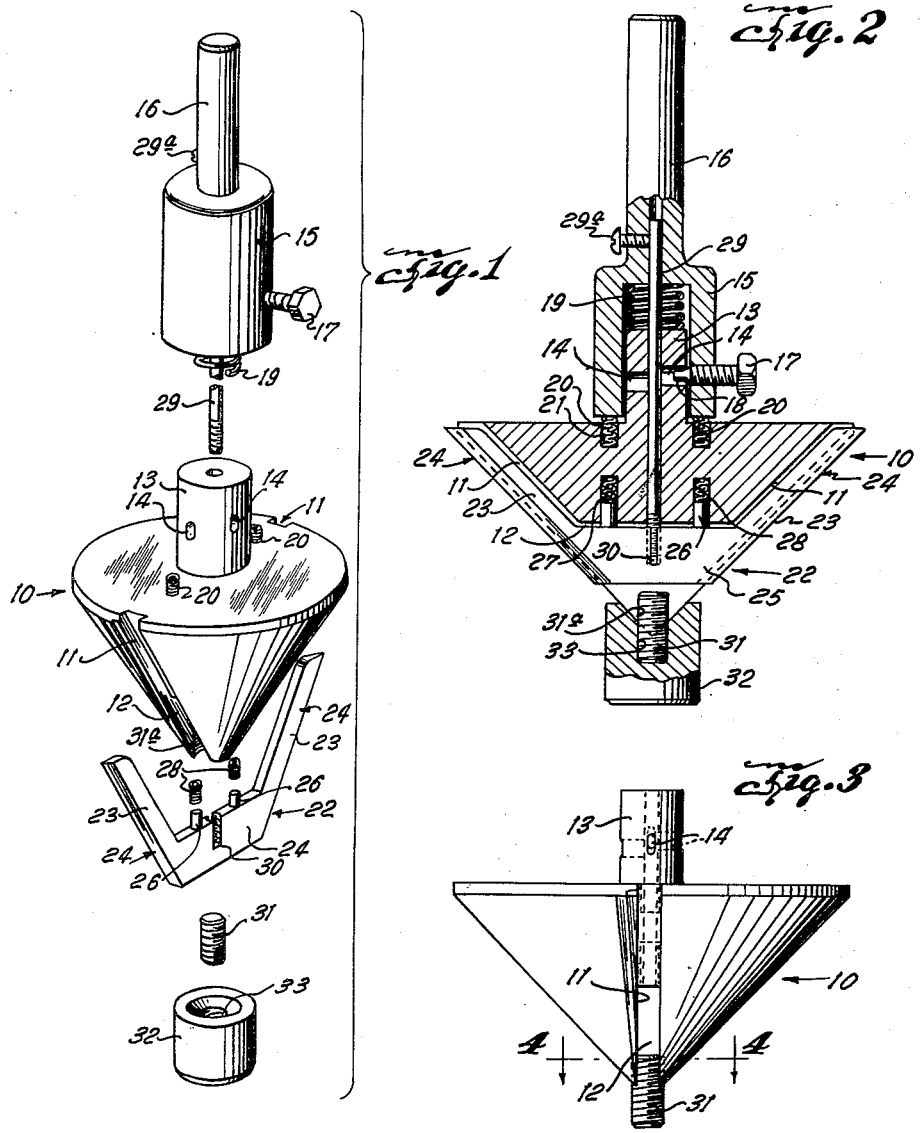
EUGENE T. RIZA
INVENTOR.
ATTORNEY Patented Nov. 16, 1954

2,694,321

HOLE PLANER AND BURRING TOOL

Eugene T. Riza, Dallas, Tex.

Application July 2, 1953, Serial No. 365,603

10 Claims. (Cl. 77—73.5)

This invention relates to machinists' tools and more particularly to a hole planer or burring tool.

The principal object of the invention is to obviate the time consuming and therefore costly practice of hand burnishing to remove the bur remaining about the edges of holes drilled in metals, plastics and other substances, the invention accomplishing this and other reaming, burring and burnishing operations automatically and with a uniformly deep or shallow but, as desired, by virtue of spring-biased blades countersunk in the coniform surface of a rotatable body which latter itself functions as a bearing to insure uniformity and depth of cut performed by the blades.

Another object of the invention is to provide a cushion press in the form of coil springs interposed between the coniform head or body and its driving spindle as well as between the adjustable blades and the head, thus to insure accurate centering of the tool in relation to the work before the blades are brought into contact with the work. This provision enables the tool to be employed with equal efficiency on both hard and soft materials.

Still another object of the invention is to provide a burring, hole finishing, reaming and burnishing tool whose particular shape adapts itself to holes throughout a wide range of diameters without need for adjustments of any nature.

Other objects will appear as the description proceeds when considered with the annexed drawing, wherein:

Figure 1 is an exploded top perspective of a tool constructed according to the invention.

Figure 2 is a view thereof partly in vertical section.

Figure 3 is a side elevational view, and

Figure 4 is a view in transverse section, taken on line 4—4 of Figure 3.

Continuing with a more detailed description of the drawing, reference numeral 10 denotes generally the tool head or body which is produced from steel and casehardened to withstand the considerable frictional wear to which it is subjected and is made in conical shape to adapt it to holes of different diameters. It is preferred also that the body or head be chrome plated which has the effect to further reduce wear, chatter and to otherwise protect the head.

The plane of the conical surface of the head is preferably at an angle of 45° in relation to the rotating axis of the head and formed in the conical face of the latter are two, diametrically opposed slots 11 which converge into a transverse slot 12 intersecting the rotating axis of the head at its apex.

Rising from the geometrical center of the head 10 is an integral shank 13, in which is drilled a plurality of circumferentially spaced oblong holes 14 which are spaced longitudinally different distances from the top of the head 10. A cylindrical box 15 is formed on a drive spindle 16 and is adapted to receive the shank 13 of the head 10. A screw 17 is threaded through the wall of the box 15 and has a reduced end 18 which passes freely through a selected hole 14 and, by virtue of the oblong shapes of the holes 14, the head 10 is permitted slight vertical movement in relation to the spindle 16.

A coil spring 19 is encased in the box 15 above the shank 13, one end thereof bearing against the shank while its opposite end bears against the end of the bore in the box, thus normally biasing the head away from the box 15. A force counter to that of spring 19 is exerted by a pair of diametrically opposed smaller coil springs 20, disposed in recesses 21 in the top of head 10, one on each side of the shank 13 (Figure 2). The upper ends of these springs bear against the lower end of the box 15, as shown.

A substantially V-shaped cutter 22 is provided, whose legs are formed into blades 23, each being receivable in a slot 11 in the head 10. The width of each blade 23 is substantially equal to the depth of the slot 11 in which it reposes and each blade has a beveled cutting edge 24.

The cutting element 22 is formed with a bridge 25 joining the blades 23 at their lower ends and this bridge is conformably and slidably disposed in the transverse slot 12 of the head. The bridge 25 presents a parallel surface to the base of slot 12 and on this surface is formed a pair of opposed cutter guide studs 26 which are slidably received in correspondingly shaped holes 27 originating at the base of slot 12 and extending upwardly into the head 10. A coil spring 28 is arranged in each hole to bear against the base of the hole at one end and against the end of the stud therein at its opposite end, thereby exerting a force tending to bias the head 10 upwardly in relation to the cutting element 22, due to the fact that the cutting element and the spindle box 15 are made stationary in relatively adjusted positions by an axial bolt 29 whose upper end is adjustably secured by a set screw 29a in a bore in the box 15 while its lower end is threaded into a split hole 30 in the top and center of the rib or bridge 24 of the cutting element 22. In this manner, the head 10 actually floats between the cutting element 22 and the driving spindle 16 but the effect is to expose the cutting blades 23 to the work, receding into the head 10 a distance predetermined by the setting of the adjusting bolt 29 under the pressure by which the tool is urged against the work. The adjustment of bolt 29 is accomplished by loosening the set screw 29a, moving the bolt 29 to change the position of the cutter 22 in relation to the head 10 and finally tightening the set screw 29a. The screw 17, which also bears against the adjusting bolt 29 and determines the distance the blades are to extend out of their respective slots 11, must also be loosened for the above adjustment and tightened after the adjustment is made.

It will be observed in Figures 1 and 2 that the cutter element 22 is truncated to accommodate a threaded stud 31 which enters a threaded portion 31a in the apex of the conical body, as shown. A hole guide 32 is optionally provided and has a threaded bore 33 which receives the lower end of the threaded stud 31.

Manifestly, the construction as shown and described is capable of some modification and such modification as may be construed to fall within the scope and meaning of the appended claims is also considered to be within the spirit and intent of the invention.

What is claimed is:

1. A hole planer and burring tool comprising a coniform body having diametrically opposed slots in its tapered face interconnected by a transverse slot in said body originating at the apex thereof, a substantially V-shaped cutting element consisting of a bridge portion slidable under spring resistance in said transverse slot and whose legs define cutting blades movable within said diametrically opposed slots, a driving spindle to which said body is connected and in relation to which said body is spring biased between said cutting element and its point of connection to said spindle and means extending axially through said body for joining said spindle and said cutting element and for predetermining the degree of extension of said cutting blades from their respective slots in said body.

2. A hole planer and burring tool comprising a conical body having a shank, a driving spindle having a box in which said shank is disposed for limited longitudinal displacement, said body having longitudinal slots in and coextensive with its tapered face and communicating with a transverse slot in the apex of said body, a cutting element having a portion movable in said transverse slot and leg portions disposed in said longitudinal slots, means connecting said box and said cutting element for relative adjustment to predetermine the degree of extension of said blades from said longitudinal slots and spring means normally urging said blades out of said slots.

3. A tool of the character described comprising a coniform rotatable body having diametrically opposed slots in its tapered sides and a transverse slot in its apex intersecting the rotating axis of said body, a driving spindle, means connecting said body to said driving spindle for limited longitudinal displacement in relation thereto, spring means normally biasing said body away from said spindle, cutting blades disposed in said diametrically opposed slots, a bridge movable in said transverse slot integral with said blades, spring means normally biasing said bridge toward said body apex to effect recession of said blades from said opposed slots and means extending axially through said body for connecting said spindle and bridge and effective to predetermine the degree of displacement of said blades with respect to said opposed slots.

4. In a tool of the character described, a coniform head having a shank and a pair of diametrically opposed slots in its tapered sides, a driving spindle to which said shank is connected for limited longitudinal displacement, a cutting element defining angular blades lying in and movable into and out of said slots, spring means normally urging said blades outwardly and means connecting said spindle and said cutting element for adjustment toward and away from each other to predetermine the degree of displacement of said blades into and out of said slots.

5. The structure of claim 4, a means normally biasing said body away from said driving spindle.

6. A tool of the character described comprising a tapered head having a shank and a plurality of slots coextensive with and disposed longitudinally in its tapered surface, a driving spindle to which said shank is attached for limited longitudinal movement, a substantially V-shaped cutting element having blades disposed in said slots, means extending axially through said head and connected at its upper and lower ends to said spindle and said cutting element, respectively, and adjustable longitudinally to predetermine the spacing between said head and said blades.

7. The structure of claim 6, and spring means between said head and spindle and between said head and cutting element exerting opposing forces tending to yieldingly suspend said head between said spindle and said cutting element.

8. In a tool of the character set forth, a conical body having a shank and longitudinal grooves in its tapered sides, a cutting element defining blades disposed one in each groove of said body and joined together through a transverse slot through the apex of said body, a spindle for rotating said body, a box connecting said shank to said spindle for limited longitudinal displacement, means connecting said cutting element to said box through the rotating axis of said body and adapted for longitudinal adjustment to vary the spacing between said box and said cutting element and to predetermine the degree of extension of said blades from said grooves and spring means normally maintaining extended position of said blades in relation to their grooves.

9. The structure of claim 8, and spring means normally biasing said body away from said box.

10. The structure of claim 8, and a hole guide detachably connected to the apex of said body.

References Cited in the file of this patent

UNITED STATES PATENTS

| Number | Name | Date |
| --- | --- | --- |
| 2,187,221 | Brown | Jan. 16, 1940 |
| 2,418,790 | Peckham | Apr. 8, 1947 |